United States Patent [19]
Kemsley

[11] Patent Number: 6,079,714
[45] Date of Patent: Jun. 27, 2000

[54] BRUSH SEAL AND METHOD FOR THE MANUFACTURE OF A BRUSH SEAL

[75] Inventor: Nicholas J Kemsley, Loughborough, United Kingdom

[73] Assignee: European Gas Turbines Limited, United Kingdom

[21] Appl. No.: 09/024,705

[22] Filed: Feb. 17, 1998

[30] Foreign Application Priority Data

Feb. 18, 1997 [GB] United Kingdom ............... 9703328

[51] Int. Cl.⁷ .................................... F16J 15/447
[52] U.S. Cl. .............................. 277/303; 277/355
[58] Field of Search ............................ 277/355, 303

[56] References Cited

U.S. PATENT DOCUMENTS

| | | | |
|---|---|---|---|
| 4,202,554 | 5/1980 | Snell | 277/355 |
| 4,678,113 | 7/1987 | Bridges et al. | 277/355 |
| 4,971,336 | 11/1990 | Ferguson | 277/355 |
| 5,026,252 | 6/1991 | Hoffelner | 277/355 |
| 5,135,237 | 8/1992 | Flower | 277/355 |
| 5,176,389 | 1/1993 | Noone et al. | 277/355 |
| 5,201,530 | 4/1993 | Kelch et al. | 277/355 |
| 5,480,165 | 1/1996 | Flower | 277/355 |
| 5,498,139 | 3/1996 | Williams . | |

FOREIGN PATENT DOCUMENTS

| | | |
|---|---|---|
| 0 500 486 A1 | 8/1992 | European Pat. Off. . |
| 0743 424A1 | 11/1996 | European Pat. Off. . |
| 2 021 210 | 11/1979 | United Kingdom . |
| 2021209 | 11/1979 | United Kingdom ............... 277/355 |
| 2 212 228 | 7/1989 | United Kingdom . |
| WO 92/14951 | 9/1992 | WIPO . |

*Primary Examiner*—Chuck Y. Mah
*Attorney, Agent, or Firm*—Kirschstein, et al.

[57] ABSTRACT

A brush seal is provided having the conventional 45° bristle angle for part only of the seal length, the angle being varied through at least part of the remainder of the length, preferably finishing at 90° at the ends of the seal. The seal may have the form of a semicircle with straight end-extensions, the bristle angle in the straight extensions being 90°. Provision is also made to vary the length of the exposed part of the bristles so that, in areas where bristle density is high, the actual exposed length is reduced. In a method for manufacturing the seal, the bristle holder is made as a complete loop having two straight sections and two semicircular sections and the bristles are secured in the holder in accordance with the required variations in angle and exposed length such that two mirror-image seals exist on the two sides of a line joining the centerpoints of the straight sections, the holder then being divided into two along that line.

13 Claims, 4 Drawing Sheets

BRUSH SEAL AND METHOD FOR THE MANUFACTURE OF A BRUSH SEAL

BACKGROUND OF THE INVENTION

The invention relates to a brush seal, in particular a brush seal for reducing leakage of gas in a gas turbine engine, and a method for the manufacture of such a brush seal.

Static gas seals and seals which are required to seal around a rotating shaft are often circular in shape and are configured so that each of the bristle elements is set at an angle of approximately 45° to a tangent to the circular holder. In the case of a shaft seal, the direction of inclination of the bristles corresponds to the direction of rotation of the shaft. Such seals are designed with bristles of sufficient density and length to ensure reliable sealing.

In FIG. 1 a gas-turbine clamp member containing a brush seal assembly is shown taken from a co-pending patent application GB 9510069.9 of the present applicants and which includes a pair of inner seals 72 and a pair of outer seals 71. The seals comprise a respective holder 80 and a set of bristle elements (a bristle pack) 73, 75 secured in the holder. Each bristle pack consists of a secured end embedded or clamped in its holder and a free or exposed end designed to abut against a surface to be sealed.

The inner bristle packs 73 are, in use, urged against respective adjacent inner annular duct sections interfacing a combustion chamber with the turbine blade housing, while the outer bristle packs 75 are likewise urged against respective adjacent outer sections. The pairs of inner and outer seals at the two ends of the seal assembly serve to seal off the space between, respectively, the incoming inner and outer duct sections and the outgoing inner and outer duct sections. Thus, in use, it is intended that there be a gas-tight seal between incoming outer duct, one of the outer bristle packs 75, neighboring inner bristle pack 73 and the incoming inner duct on the one hand, and between the outgoing outer duct, the other of the outer bristle packs 75, the neighboring inner bristle pack 73 and the outgoing inner duct on the other. Thus, the action of the seals is to close off the space between the inner and outer ducts at each end.

SUMMARY OF THE INVENTION

In accordance with a first aspect of the invention there is provided a seal comprising a plurality of bristle elements secured in a holder, wherein an angle of orientation of said bristle elements relative to said holder varies over at least part of a longitudinal extent of said holder.

At least a portion of said holder may be in the form of a semicircle and an angle of orientation of said bristle elements to a tangent at respective points along said semicircle at which the respective bristle elements emerge from said holder may vary between a first value in a central region of said semicircle and second and third values at respective end-regions of said semicircle. The first value may be substantially 45° and said second and third values both substantially 90°.

The holder may comprise a semicircular portion and end-portions constituting substantially linear tangential extensions of said semicircle. The bristle-element angle in said end-portions may be substantially 90°.

The angle of orientation of bristle-elements at the longitudinal extremes of said holder may be such as to give rise to a protrusion of said bristle elements from an end-profile of said holder. The bristle elements at said extremes may be oriented within 10° of perpendicular relative to the holder.

An exposed length of said bristles taken perpendicular to said holder at respective points of said holder at which said bristles emerge may vary over at last part of a longitudinal extent of said holder. The variation in exposed length may be such as to lead to a desired seating disposition of said seal against an associated surface to be sealed, and in particular may lead to a centralization of said seal against said surface.

The exposed length may be less in a region of said seal in which a density of said bristle elements at a free end of said elements is greater.

The exposed length, working from one end of said seal to the other, may be least in a region of said holder extending from a first end of said holder at which said bristle elements would overhang, were there to be no variation in bristle-element angle along said holder, to a point along said holder forming an angle of approximately 40° with a centreline bisecting the semicircular portion of said holder; increases then to a maximum value at approximately said centreline; maintains said maximum value to a point along said holder forming an angle of approximately 65° with said centreline; reduces then to an intermediate value at a start of said linear end-portion at which there would be a gap in said bristle elements, were there to be no variation in bristle-element angle along said holder, and finally remains at said intermediate value along said linear end-portion to the second end of said holder.

In accordance with a second aspect of the invention there is provided a method of manufacturing a brush seal as described above, comprising the steps of:

(a) forming a holder as a continuous piece having two linear portions and two semicircular portions, corresponding first ends of said linear portions being joined by one of said semicircular portions and corresponding second ends of said linear portions being joined by the other of said semicircular portions;

(b) securing said bristle elements in said holder in accordance with said variable angular orientation such that the angular orientation of elements on one side of a line joining midpoints of said linear portions is a mirror image of the angular orientation of elements on the other side of said line;

(c) trimming the exposed length of said elements in accordance with said variation in exposed length such that the variation in length of elements on one side of a line joining midpoints of said linear portions is a mirror image of the variation in length of elements on the other side of said line;

(d) dividing the holder into two along said line thereby to form a pair of brush seals.

Prior to step (d) an elongate metal heat-shield element may be secured to said holder along one side thereof, said heat-shield element being divided into two along said line during step (d).

Prior to step (d) a groove may be provided in said holder along the longitudinal extent of one side thereof and subsequent to step (d) a metal heat-shield element may be secured in the groove of each of the resulting pair of seals.

BRIEF DESCRIPTION OF THE DRAWINGS

Embodiments of a brush seal according to the invention will now be described, by way of example only, with reference to the accompanying drawings, of which.

DETAILED DESCRIPTION OF EMBODIMENTS OF THE INVENTION

Figure 1:
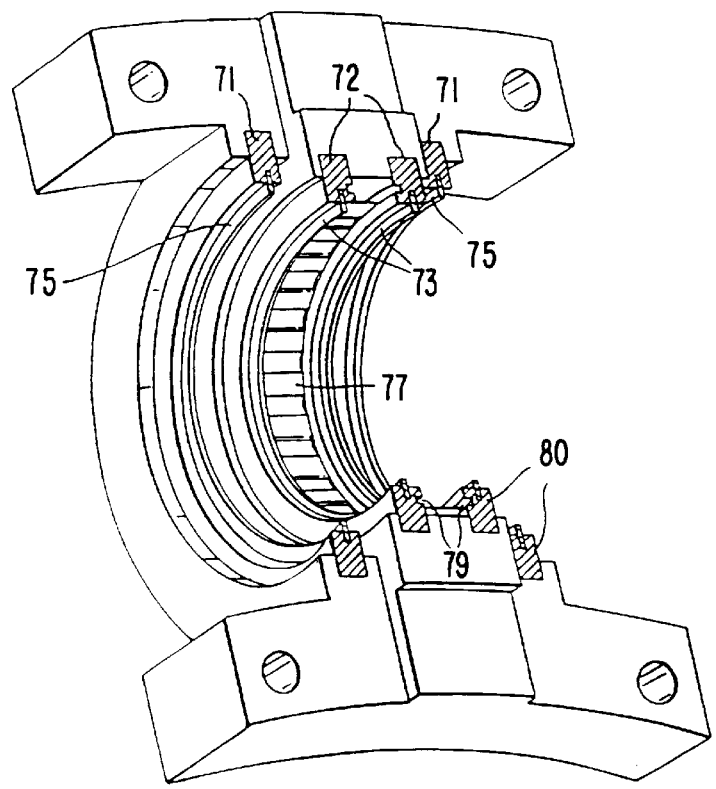
FIG. 1 is a perspective view of a clamp member employed in a gas turbine engine and containing a brush seal assembly according to the prior art.

The seals described earlier with reference to FIG. 1 are semicircular in form with small straight extensions to the ends of the semicircle. In this case use of a conventional 45° orientation of the bristles leads to an undesirable situation in which there is a gap at one end of the seal and an overlap of the bristles beyond the profile of the holder at the other. This is shown in FIG. 2, in which the bristles 20 (of which only a few are shown it goes without saying that there will be many more than that in practice) each at 45° can be seen to extend beyond the seal profile at the upper end 22 and fall short of it at the lower end 24, thereby forming an undesirable gap 26 at the lower end through which gas can escape and requiring trimming of the overhanging bristles 27 at the upper end.

Figure 2:
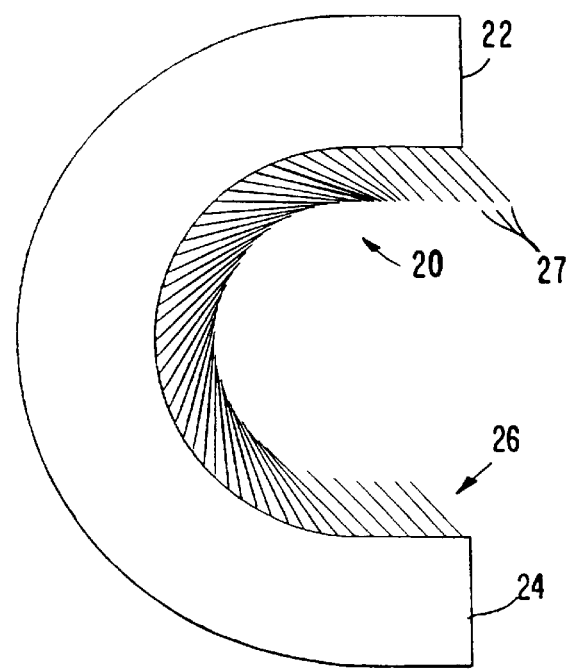
FIG. 2 is a side view of a brush seal as might be used in the clamp member of FIG. 1 and employing a conventional bristle configuration.
Figure 3:
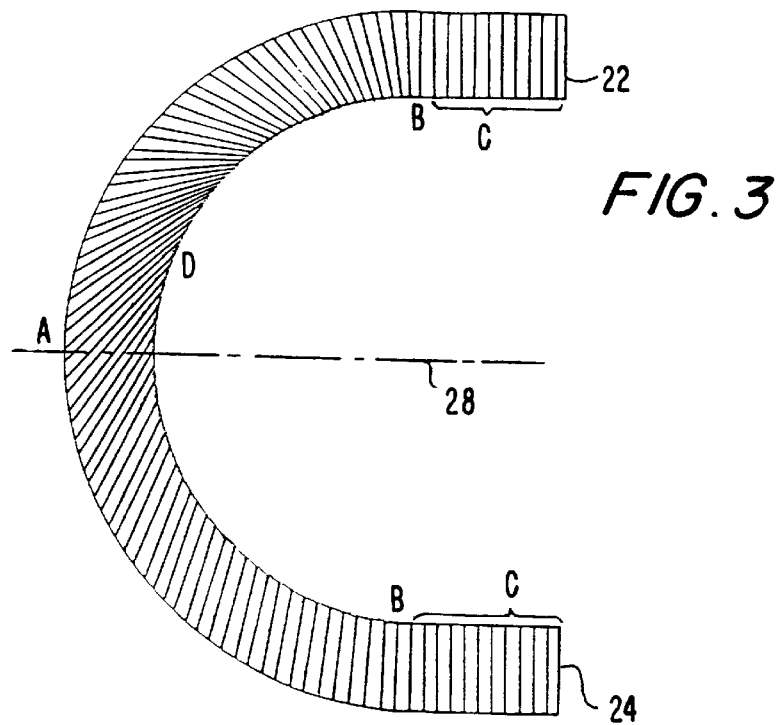
FIG. 3 is a partial side view of a brush seal in accordance with the present invention.

Turning now to FIG. 3, in which incidentally only the exposed part of the bristles is shown, there is illustrated the solution of the present invention to the problem of the undesirable gap and overhang present in the configuration of FIG. 2. This solution consists in grading the angle of orientation of the bristles from 45° in a mid-region A of the semicircular part of the seal to 90° at the ends B of the semicircular part and on into the linear parts C. This arrangement ensures that no gap is left at the lower end 24 of the seal or an overhang at the upper end 22. The angle of orientation referred to is the angle of the bristles to a tangent at respective points along the semicircle BDB at which the respective bristle elements emerge from a holder (such as holder 80, FIG. 1).

In practice, while this bristle configuration does indeed solve the problem adumbrated earlier, it also in so doing creates a further problem, namely an asymmetrical stiffness of the bristle pack resulting in an inability of the seal to sit concentrically around the surface to be sealed. This problem is a consequence of the fact that now the bristle density of the seal is greater in a region above the horizontal centreline 28 of the seal compared with a corresponding region below that centreline. A higher bristle density results in greater bristle stiffness so that an out-of-balance force is exerted on the relevant parts of the seal when the latter is mounted against the surface to be sealed. In the case of the seal as shown in FIG. 3, the seal will be displaced upwards and to the left or a Newtonian reaction will move the duct down and to the right.

Figure 4:
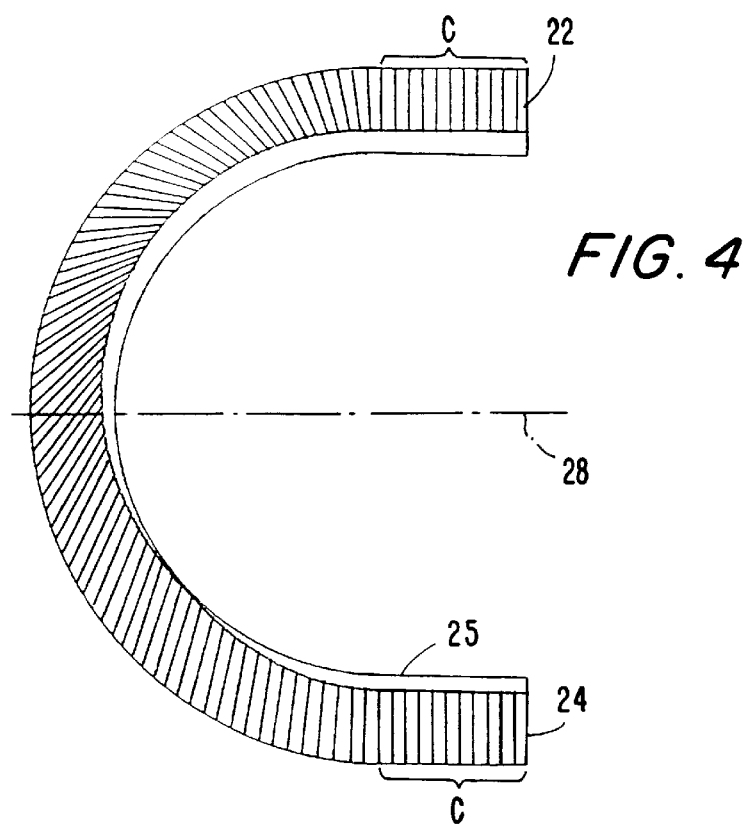
FIG. 4 shows the brush seal of FIG. 3 in which the length of the bristles is profiled in accordance with the present invention.

The solution to this second problem is illustrated in broad schematic terms in FIG. 4, and consists in trimming the exposed length of the bristles to create a non-uniform bristle profile around the extent of the holder. In principle, material is cut away at the ends of the seal (regions C) and some way into the semicircular portion, the amount cut away reducing then to zero at a point proximate the centreline 28. Also, more bristle is removed at the top end 22 of the seal than at the bottom end 24.

Figure 5:
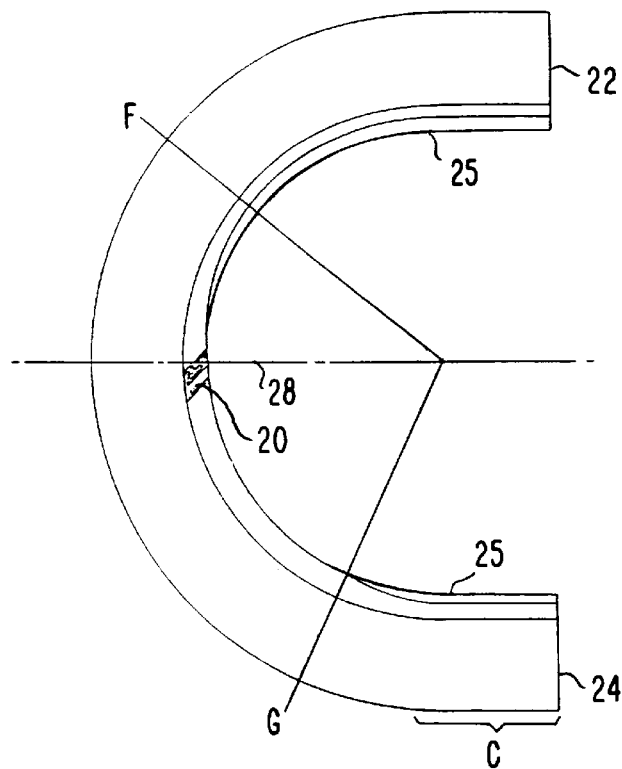
FIG. 5 shows a preferred bristle profile in accordance with the present invention.

The actual degree of trimming is determined empirically to result in the best seating balance of the seal around its associated surface (i.e. a central seating) and the inventor has found that optimum seating is produced for this particular application when a bristle profile such as that shown in FIG. 5 is employed. In FIG. 5 the length of the bristles 20, i.e. the radial length for the semicircular portion and the actual length for the straight portions, is least in the upper part of the seal starting from the end 22 at which the bristles would overhang without any variation in bristle angle to a point F along the seal forming an angle of roughly 40° to the centreline 28, increases then steadily to a maximum value at the centreline itself, remains at that maximum value to a point G at approximately 65° to the centreline, reduces again steadily to an intermediate value at the start of the straight portion C at the lower end of the seal, and remains at that value to the very end 24 of the seal.

The ratio of maximum bristle length to minimum bristle length is approximately 2:1, while the ratio of intermediate to minimum value is approximately 1.2:1.

For comparison with FIG. 3 in which no profiling of bristle length is performed, the original regular bristle profile is shown in FIGS. 4 and 5 as curve 25.

Figure 6:
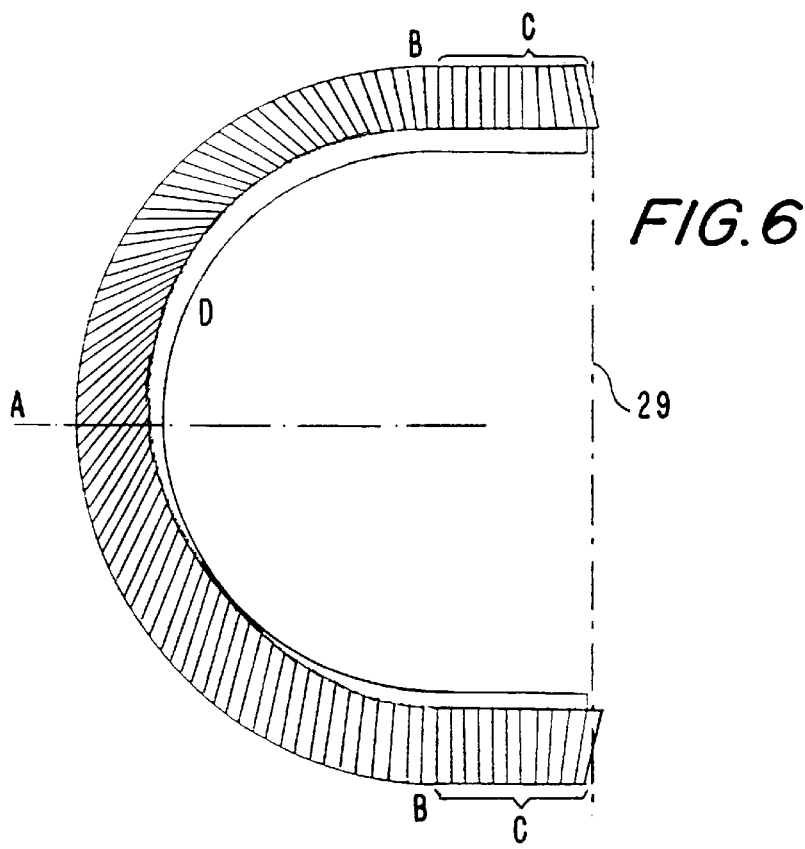
FIG. 6 shows a second embodiment of the brush seal according to the invention.

In a second embodiment of the invention the bristles at the very ends of the seal are taken beyond perpendicular to an angle within a certain range of perpendicular, e.g. $\leq 10°$ of perpendicular, in order to produce a slight overhang beyond the end profile of the seal holder. Such a configuration is shown in FIG. 6, in which the bristles in the end-portions of the sections C can be seen to be angled away from 90° so that the bristles at the very end extend beyond the holder (not shown). The overhanging parts of the outermost bristles are then cut on a line somewhat beyond the end-profile of the holder, e.g. on line 29, in order to provide an improved seal against the part of the surface (e.g. gas-turbine duct) which abuts the ends 22, 24, of the seal. Instead of including an overhang at both ends of the seal, it is possible to employ only one overhang at one end.

Figure 7:
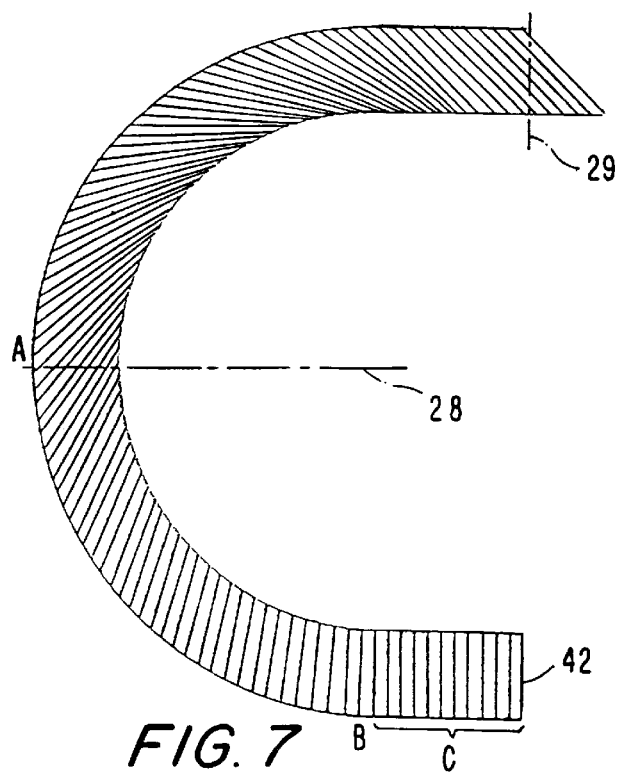
FIG. 7 shows a third embodiment of the brush seal according to the invention.

A further embodiment of the invention is shown in FIG. 7. In FIG. 7 the problem of the bristle gap at the lower end 24 of the seal is addressed, while maintaining the overhanging feature at the upper end 22 which results from the continuation of the 45° degree bristle orientation from the centreline 28 upwards all the way round clockwise. All that is required then is that the overhanging bristles be trimmed down to a line 29 slightly beyond the end-profile 22, in a similar manner to the configuration of FIG. 6.

The varying profile of the exposed length of the bristles is not shown in FIG. 7, but will be arrived at empirically in the same way as the earlier embodiments. Clearly, the fact that in FIG. 7 the 45° angle persists right round to the end of the upper part of the seal will mean that the cutaway profile will be different here from that in, say, FIG. 4 or FIG. 5.

Figure 8:
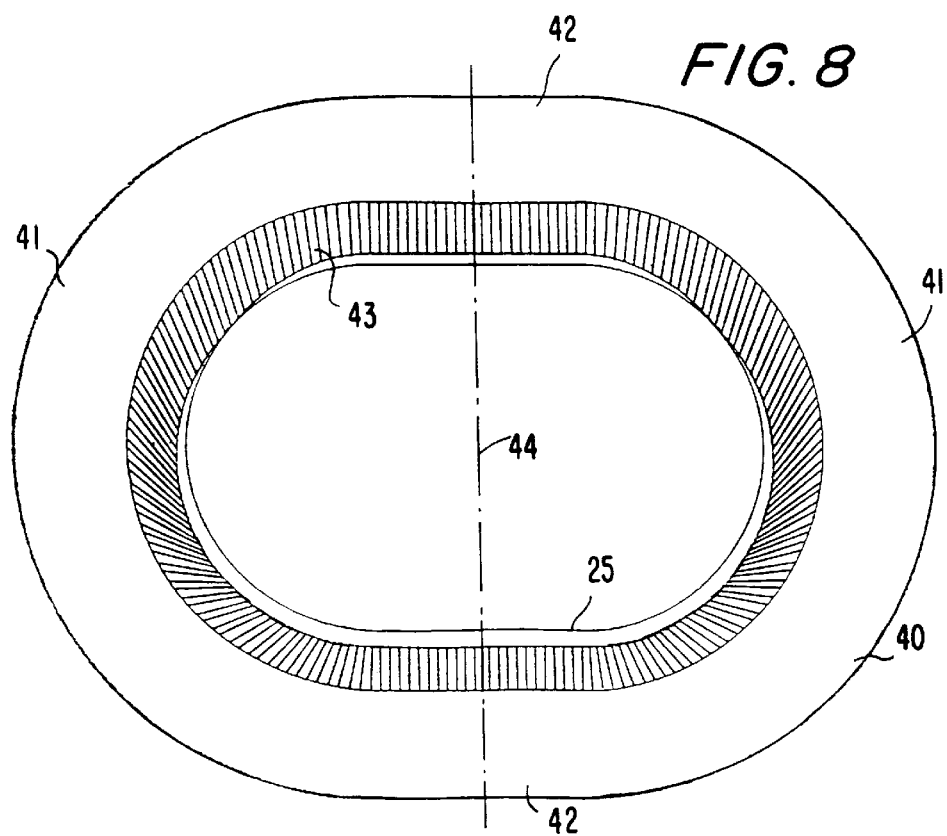
FIG. 8 is a diagram of a manufacturing scheme for the production of the brush seal according to the invention.

It will be noted that, in a clamp device such as that shown in FIG. 1, the two inner seals 72 are identical, other than having a bristle orientation of opposite hand, and likewise the two outer seals 71. In view of this, each seal pair can be made as one piece initially and then divided. Such an arrangement is shown in FIG. 8, where a holder 40 is formed into what might be termed a "racetrack" configuration having two semicircular portions 41 and two straights 42. The bristles 43 are then secured in the holder 40 at the angles already described and then trimmed to a varying length also as described.

Both the angle orientation configuration and the bristle-length profiling are in the form of two mirror-image halves reflected in the vertical centreline 44 (the unprofiled bristle length 25 is also shown so reflected, again for comparison with the profiled configuration). The next step is then to divide the holder 40 in half along the line 44 in order to obtain a pair of identical seals which can be employed as either the outer or the inner seals shown in FIG. 1.

Figure 9:
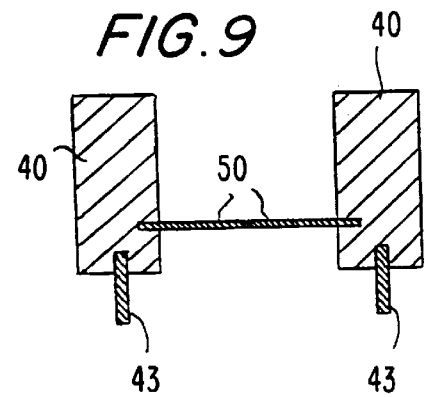
FIG. 9 is a partial sectional end view of the scheme of FIG. 8 and incorporating an integral heat shield.

As already described at the beginning in connection with the gas-turbine clamp arrangement of FIG. 1, a metal heat-shield is incorporated into the clamp to protect the clamp from contact with hot gases leaking between the inner seals. The method of manufacture of the seals just described lends itself readily to realization of this feature also, since the grooves which receive the metal strip 77 (see FIG. 1) can be formed along the entire length of the holder 40 along one side thereof so that, when the holder 40 is divided, the grooves of both halves face each other to receive the strip. As an alternative to the use of a strip with grooves, one side of the holder 40 may be equipped with a metal tang having an exposed width equal to one-half the width of the strip 77 shown in FIG. 1. In this case, when the holder 40 is divided along the centreline, so also is the tang; then when the seals (the two halves of the assembly shown in FIG. 8) are mounted in the clamp arrangement of FIG. 1, the tangs of both seals will abut each other to form a shield of effectively full width. This arrangement is shown in cross-sectional view in FIG. 9, where a tang 50 can be seen to be secured to each seal holder 40, the bristles 43 being also shown.

I claim:

1. A brush seal, comprising: a holder having first and second ends, said holder having a longitudinal extent between said first and second ends, and a pack of bristle elements secured in said holder over said longitudinal extent of said holder, each said bristle element having a secured end secured within said holder and a length extending away from said holder to a free end of said bristle element, said bristle elements being held by said holder at an angle of orientation of said bristle elements relative to said longitudinal extent of said holder, said angle of orientation varying over at least part of said longitudinal extent of said holder, thereby to prevent formation of a gap in said pack of bristle elements at at least one of said first and second ends of said holder.

2. Brush seal as claimed in claim 1, wherein at least a portion of said holder is in the form of a semicircle and said angle of orientation of each said bristle element is relative to a tangent at respective points along said semicircle at which respective bristle elements emerge from said holder, said angle of orientation varying between a first value in a central region of said semicircle and second and third values at respective end-regions of said semicircle.

3. Brush seal as claimed in claim 2, wherein said first value is substantially 45° and said second and third values are both substantially 90°.

4. Brush seal as claimed in claim 2, wherein said holder comprises a semicircular portion and end-portions constituting substantially linear tangential extensions of said semicircle.

5. Brush seal as claimed in claim 4, wherein said angle of orientation of bristle elements in said end-portions is substantially 90°.

6. Brush seal as claimed in claim 2, in which said angle of orientation of said bristle elements at said first and second ends of said holder causes exposed ends of said bristle elements to overhang at least one of said first and second ends of said holder.

7. Brush seal as claimed in claim 6, wherein said bristle elements at said first and second ends are oriented within 10° of perpendicular relative to the holder.

8. Brush seal as claimed in claim 1, each said bristle element having an exposed length projecting from said holder, said exposed length being measured perpendicular to said holder at a location where each said bristle element emerges therefrom, wherein said exposed length of said bristle elements varies over at least part of said longitudinal extent of said holder.

9. Brush seal as claimed in claim 8, wherein said variation in said exposed length achieves a desired seating disposition of said seal against an associated surface.

10. Brush seal as claimed in claim 9, wherein said variation in said exposed length achieves centralization of said seal against said surface.

11. Brush seal as claimed in claim 8, wherein said holder comprises a semicircular portion and first and second end-portions constituting substantially linear tangential extensions of said semicircular portion, and wherein said angle of orientation of said bristle elements at said first end of said holder causes exposed ends of said bristle elements to overhang said first end of said holder, and wherein said exposed length is least in a region of said holder extending from said first end of said holder to a point along said holder forming an angle of approximately 40° with a centreline bisecting the semicircular portion of said holder; increases then to a maximum value at approximately said centreline; maintains said maximum value to a point along said holder forming an angle of approximately 65° with said centreline; reduces then to an intermediate value at a start of said second end-portion, and finally remains at said intermediate value along said second end-portion to said second end of said holder.

12. A brush seal, comprising: a holder having first and second ends, said holder having a longitudinal extent between said first and second ends, said holder having a semicircular portion in a form of a semicircle, said semicircular portion having a central region and end-regions; and a plurality of bristle elements secured in said holder over said longitudinal extent at an angle of orientation that varies over at least part of said longitudinal extent, said angle of orientation of each said bristle element being measured relative to a tangent at respective points along said semicircle at which respective bristle elements emerge from said holder, said angle of orientation varying between a first value at said central region of said semicircular portion, and second and third values at respective said end-regions of said semicircular portion.

13. A brush seal, comprising: a holder having first and second ends, said holder having a longitudinal axis between said first and second ends, said holder having a semicircular portion in a form of a semicircle, and first and second end-portions constituting substantially linear tangential extensions of said semicircle; and a plurality of bristle elements secured in said holder over said longitudinal extent at an angle of orientation that varies over at least part of said longitudinal extent, each said bristle element having an exposed length projecting from said holder, said exposed length being measured perpendicular to said holder at a location where each said bristle element emerges from said holder, said exposed length of said bristle elements varying over at least part of said longitudinal extent of said holder, said angle of orientation at said first end causing exposed ends of said bristle elements to overhang said first end, said exposed length i) having at least value in a region of said holder extending from said first end to a point along said holder forming an angle of approximately 40° with a centerline bisecting the semicircle,
  ii) increasing to a maximum value at approximately said centerline,
  iii) maintaining said maximum value to a point along said holder forming an angle of approximately 65° with said centerline,
  iv) decreasing to an intermediate value at a start of said second end-portion, and
  v) remaining at said intermediate value along said second end-portion to said second end of said holder.

* * * * *